United States Patent
Rzadki et al.

(10) Patent No.: US 7,353,764 B2
(45) Date of Patent: Apr. 8, 2008

(54) CORVETTE SHIP-TYPE EQUIPMENT SYSTEM

(75) Inventors: Wolfgang Rzadki, Glinde (DE);
Karl-Otto Sadler, Hamburg (DE);
Matthias Schulze, Lüneburg (DE);
Hannes Schulze Horn, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 10/527,718

(22) PCT Filed: Sep. 12, 2003

(86) PCT No.: PCT/DE03/03033

§ 371 (c)(1),
(2), (4) Date: Sep. 21, 2005

(87) PCT Pub. No.: WO2004/026683

PCT Pub. Date: Apr. 1, 2004

(65) Prior Publication Data

US 2006/0135006 A1 Jun. 22, 2006

(30) Foreign Application Priority Data

Sep. 14, 2002 (DE) ............ 202 14 297 U (51) Int. Cl.
*B63B 3/00* (2006.01)
(52) U.S. Cl. .............. 114/65 R; 114/56.1; 440/3; 440/6; 440/38
(58) Field of Classification Search ........... 114/1, 114/56.1, 65 R; 440/3, 6, 38
See application file for complete search history.

(56) References Cited

U.S. PATENT DOCUMENTS 3,943,876 A * 3/1976 Kiekhaefer ............ 440/43

(Continued)

FOREIGN PATENT DOCUMENTS

DE 100 19 352 A 6/2001

(Continued)

OTHER PUBLICATIONS

Dreger W: "Entwicklungstendenzen Beim Bau Zukuenftiger Korvetten Und Fregatten", Schiff Und Hafen, Seehafen-Verlag Erik Blumenfeld, Hamburg, DE, vol. 53, No. 4, Apr. 2001, pp. 47-52, XP001112254, ISSN: 0938-1643.

(Continued)

*Primary Examiner*—Sherman Basinger
(74) *Attorney, Agent, or Firm*—Harness, Dickey & Pierce, P.L.C.

(57) ABSTRACT

A corvette ship-type equipment system includes standard-equipment segments, such as an energy generator, an energy distributor, a drive and an automation segment, and a hull which is adapted to the size and specific requirements on the corvette ship-type equipment system. In order to construct standard equipment-segments for a corvette ship-type equipment system which is technically and constructively simple and economical in terms of cost, at least one of the standard-equipment segments, such as the energy generator and/or the energy distributor and/or the drive and/or the automation segment is constructed from standard units or components which correspond to the requirements of the corvette ship-type equipment system and which are arranged in the hull of the boat and which can be built into the hull of the boat according to the different boat or ship-type equipment systems.

39 Claims, 5 Drawing Sheets

U.S. PATENT DOCUMENTS

| | | | | |
|---|---|---|---|---|
| 4,553,493 | A | * | 11/1985 | Sadler et al. .................... 114/1 |
| 4,678,439 | A | * | 7/1987 | Schlichthorst ............... 440/11 |
| 5,417,597 | A | | 5/1995 | Levedahl |
| 6,837,758 | B2 | * | 1/2005 | Drefs et al. .................... 440/6 |
| 7,099,755 | B2 | * | 8/2006 | Mueller et al. ............... 701/21 |
| 2005/0009418 | A1 | * | 1/2005 | Ries et al. .................... 440/6 |
| 2005/0037242 | A1 | * | 2/2005 | Rzadki et al. ................ 429/12 |
| 2006/0166568 | A1 | * | 7/2006 | Rzadki et al. ................ 440/38 |

FOREIGN PATENT DOCUMENTS

| | | |
|---|---|---|
| DE | 100 19 352 A1 | 6/2001 |
| DE | 101 04 892 A | 8/2002 |
| DE | 101 04 892 A1 | 8/2002 |
| WO | WO 02/057132 A1 | 7/2002 |
| WO | WO 02 057132 A1 | 7/2002 |

OTHER PUBLICATIONS

Ehrenberg H D: "Gebaute Einheiten Und Neueste Entwicklungen", Schiff Und Hafen, Seehafen-verlag Erik Blumenfeld. Hamburg, DE, vol. 48, No. 12, Dec. 1, 1996, pp. 37-38, XP000641578, ISSN: 0938-1643.

"Holeby Wins Design Award for Modular Genset Engine", Marine Engineers Review, Institute of Marine Engineers. London, GB, Apr. 1, 1996, p. 26, XP000584287, ISSN: 0047-5955.

Mahn B. et al., "Codag-Antriebsanlage Auf Fregatte F124", Schiff Und Hafen, Seehafen-Verlag Erik Blumenfeld. Hamburg, DE, vol. 50, No. 3, Mar. 1, 1998, p. 61-64, XP000750509.

Hirt M. et al., "Wirtschaftliche Und Technisch Optimierte Getriebe in Fregatten Und Korvetten", Schiff Und Hafen, Seehafen-Verlag Erik Blumenfeld. Hamburg, DE, vol. 50, No. 5, May 1, 1998, pp. 61-63, XP000750534, ISSN: 0938-1643.

Gamble B. And Goldman J.: "High temperature superconducting motors and generators fo submarines and surface ships", Proceedings Naval Symposium on Electic Machines, Jul. 28-28, 1997, pp. 275-282, XP008000614, newport, USA. p. 275, p. 282.

Sharke P: "The Hunt for Compact Power", Geophysics, Society of Exploration Geophysicists. The American Society of Mechanical Engineering., Apr. 2000, page Complete XP008000664, Tulsa, USA ISSN: 0016-8033.

International Search Report, International Preliminary Examination Report and German Translation Aid.

Dreger W: "Entwicklungsteendenzen beim Bau zukünftiger Korvetten und Fregatten", SChbiff und Hafewn, Seehafen-Verlag Erik Blumenfeld, Hamburg, DE, Band 53, Nr. 4, Apr. 2001, Seiten 47-52, XP001112254, ISSN: 0938.

Ehrenberg H.D. "Gebaute Einheiten und neueste Entwicklungen", Schiff und Hafen, Seehafen-Verlag Erik Blumenfeld, Hamburg, DE, Bd. 48, Nr. 12, Dec. 1, 1996, Seiten 37-38, XP000641578, ISSN: 0938-1643.

HOLEBY Wins Design Award for Modular Genset Engine, Marine Engineers Review, Institute of Marine Engineers, London, GB, Apr. 1, 1996, Seite 26, XP000584287, ISSN: 0047-5955.

Mahn B. et al: "CODAG-Antribsanlage auf Fregatte F124", Schiff und Hafen, seehafen-Verlag Erik Blumenfeld, Hamburg, DE, Bd. 50, Nr. 3, Mar. 1, 1998, Seiten 61-64, XP000750509, ISSN: 0938-1643.

Hirth M. et al: "Wirtschaftliche und technisch optimierte Getriebe in Fregatten und Korvetten", Schiff und Hafen, Seehafen-Verlag Erik Blumenfield, Hamburg, DE, Bd. 50, Nr. 5, May 1, 1998, Seiten 61-63, XP000750534, ISSN: 0938-1643.

Gamble B. and Goldman J.: "High temperature superconducting motors and generators for submarines and surface ships", Proceedings Naval Symposium on Electric Machines, Jul. 28-28, 1997, Seiten 275-282, XP008000614, Seite 275-.Seite 282.

Shartke P: "The Hunt For Compact Power", Geophysics, Society of Exploration Geophysicists, The American Society of Mechanical Engineering, Apr. 2000, Seite Compete, XP008000664, Tulsa, USA, ISSN: 0016-8033.

\* cited by examiner

CORVETTE SHIP-TYPE EQUIPMENT SYSTEM

This application is the national phase under 35 U.S.C. § 371 of PCT International Application No. PCT/DE2003/003033 which has an International filing date of Sep. 12, 2003, which designated the United States of America and which claims priority on German Patent Application number DE 202 14 297.3 filed Sep. 14, 2002, the entire contents of which are hereby incorporated herein by reference.

FIELD OF THE INVENTION

The invention generally relates to a "corvette" vessel-type equipment system. Preferably, it relates to one having standard equipment segments, such as a power generator segment, a power distribution segment, a propulsion segment and an automation segment, and having a vessel hull which is matched to the "corvette" vessel-type equipment system on a size and requirement-specific basis.

BACKGROUND OF THE INVENTION

WO 02/057132 A1 discloses a navy vessel which is designed such that it satisfies the present-day requirements for low emissions, while furthermore ensuring a high degree of survivability in the event of battle damage.

SUMMARY OF THE INVENTION

An embodiment of the invention includes an object of providing a "corvette" vessel-type equipment system having standard equipment segments, which can be produced with less engineering effort and/or at a lower cost.

According to an embodiment of the invention, an object may be achieved in that the power generator and/or the power distribution and/or the propulsion and/or the automation segment of the "corvette" vessel-type equipment system are formed from standardized units and components which can be prefabricated, which can be installed in vessel hulls of different vessel-type equipment systems.

The solution according to an embodiment of the invention means that the individual components of the segments mentioned above—owing to the greater possible quantities involved—can be produced with considerably less technical design effort and thus also at a lower cost. Furthermore, the standardization of the units and components which form the propulsion segment and/or the automation segment of the "corvette" vessel-type equipment system results in a considerable reduction in the necessary training and incorporation measures.

According to one advantageous embodiment of the "corvette" vessel-type equipment system according to an embodiment of the invention, its standard propulsion segment has a POD propulsion segment and two waterjet propulsion segments, with the POD propulsion segment preferably being designed as a completely electrical lightweight POD propulsion segment and preferably has a power of 6 to 8, and preferably 7 MW, and has two waterjets propulsion segments, which are preferably in the form of twin waterjet propulsion segments and preferably have a power of 12 to 16, and preferably 14 (2×7), MW.

The propulsion segment includes, for example, the following standard units and components: POD units, converter units, control units and connecting units, such as transformers and a cable network. The individual units and components are arranged in accordance with the system requirements, for example with respect to the weight distribution, optimally in the "corvette" vessel-type equipment system.

Furthermore, the propulsion segments may include a thruster segment, which is preferably in the form of a 0.3 MW bow jet thruster.

In order to design the POD propulsion segment and/or the waterjet propulsion segments and/or the thruster segments with weights that are as low as possible and dimensions that are as small as possible, it is expedient for their electric motors to be designed with windings composed of high-temperature superconductors.

According to a further advantageous embodiment of the "corvette" vessel-type equipment system according to the invention, the electric motors of the POD propulsion segment and/or of the waterjet propulsion segments and/or of the thruster segment are in the form of synchronous machines with a field winding composed of high-temperature superconductors, and with the stator windings being in the form of air-gap windings.

If the waterjet propulsion segments are equipped with a coaxial exhaust-gas nozzle (see FIG. 5) segment, it is possible to dissipate exhaust gases from internal combustion engines, such as gas turbines or diesel engines, for propulsion of electrical power generating machines and possibly further systems through the waterjet propulsion segments into the water surrounding the "corvette" vessel-type equipment system, so that the detectable thermal emissions from the "corvette" vessel-type equipment system are considerably reduced.

If the "corvette" vessel-type equipment system is designed with an overall length of approximately 94 m, an overall width—amidships—of approximately 15 m and a type displacement of approximately 2000 tonnes, the POD propulsion segment of the "corvette" vessel-type equipment system is expediently arranged in the stern end of the vessel, approximately 6 m away from the sternpost, amidships.

In order to prevent the POD propulsion segment and the waterjet propulsion segments from being disadvantageously influenced when they are operated at the same time, the distance in the longitudinal direction between the center of the POD propulsion segment or the nose at its traction propeller on the one hand, and the nozzle outlet opening of the pods of the waterjet propulsion segments on the other hand is at least 15 m or 14 m, and advantageously approximately 20 m or 19 m.

According to one advantageous embodiment of the vessel hull of the "corvette" vessel-type equipment system according to an embodiment of the invention, the vessel hull is designed to broaden in the stern area of the vessel from the vessel center, preferably from a width of approximately 15 m at the center of the vessel to a width of approximately 17 m at the stern, so that the weight of the POD propulsion segment of, for example, approximately 65 tonnes and the weight of the associated equipment, such as converters, controllers, etc, of, for example, approximately 10 to 15 tonnes can be absorbed by means of it, with the vessel hull having, in the stern area of the vessel, a structure whose strength is sufficient to absorb the axial forces which occur as a result of the operation of the POD propulsion segment.

Furthermore it is advantageous for the vessel hull of the "corvette" vessel-type equipment system to have a vessel shape in the form of an arrow head (sparrow-hull form) in the stern area, preferably with skid-type profiles.

The power generator segment of the "corvette" vessel-type equipment system according to an embodiment of the invention advantageously preferably comprises two fuel cell segments and generator segments, with air-breathing PEM fuel cells advantageously being used as the fuel cell segments, and two gas-turbine-powered generators advantageously being used as the generator segments. Each fuel cell segment and each PEM fuel cell expediently has a power of approximately 4.5 MW (net) and 6 MW (gross); and the two gas-turbine-powered generators advantageously each have a power of approximately 16 MW.

In order to make it possible to design the gas-turbine-powered generators with the necessary dimensions and the necessary weight, it is expedient for them to be equipped with windings composed of high-temperature superconductors.

According to a further advantageous embodiment of the "corvette" vessel-type equipment system, its generators are in the form of synchronous machines with a field winding composed of high-temperature superconductors, with the stator winding being in the form of an air-gap winding.

A diesel reformer in each case with a power of approximately 9 MW is expediently provided in order to supply the hydrogen to the two air-breathing PEM fuel cells.

Alternatively, it is possible to provide two diesel reformers, each having a power of approximately 4.5 MW, in order to supply hydrogen to the two air-breathing PEM fuel cells. This can be particularly expedient when the two air-breathing PEM fuel cells are arranged physically separately from one another in the vessel hull of the "corvette" vessel-type equipment system.

In order to improve the survivability of the "corvette" vessel-type equipment system, it is advantageous for its power generator segment to be distributed over two or more vessel protection areas of the "corvette" vessel-type equipment system.

Expediently, a first electrical system having two air-breathing PEM fuel cells is arranged in a third vessel protection area, which is arranged between a bow-end vessel protection area and a vessel protection area amidships, preferably close to the transition to the midships vessel protection area.

If the fuel cells are intended to be arranged physically separately from one another in the vessel hull of the "corvette" vessel-type equipment system in order to improve the survivability of the "corvette" vessel-type equipment system, it is advantageous for a first electrical system having an air-breathing PEM fuel cell to be arranged in the third vessel protection area, which is arranged between the bow-end vessel protection area and the midships vessel protection area, preferably close to the transition to the midships vessel protection area, and for a further electrical system having an air-breathing PEM fuel cell to be arranged in the midships vessel protection area, preferably in its compartment V.

In a corresponding manner, a second electrical system having one to four and preferably two, generators and having one to four, and preferably two, internal combustion engines, preferably gas turbines by which the generators can be driven, can be arranged in amidships vessel protection area.

The gas turbines and the generators of the second electrical system are advantageously arranged in adjacent compartments of the midships vessel protection area.

A diesel reformer center with a diesel reformer is arranged in the bow-end vessel protection area, preferably close to the transition to the third vessel protection area.

Alternatively, the diesel reformer center can be arranged with the diesel reformer in the midships vessel protection area, preferably in its compartment VI.

In order to improve the survivability of the "corvette" vessel-type equipment system, it is advantageous with an appropriate requirement profile if a first diesel reformer center with a diesel reformer is arranged in the bow-end vessel protection area, preferably close to the transition to the third vessel protection area, and a second diesel reformer center with a diesel reformer is arranged in the midships vessel protection area, preferably in the compartment VI.

In a further advantageous embodiment of the "corvette" vessel-type equipment system according to an embodiment of the invention, a first diesel reformer center with a diesel reformer is arranged in the midships vessel protection area, preferably close to the further electrical system with an air-breathing PEM fuel cell in the compartment V, and a second diesel reformer center with a diesel reformer is arranged in the third vessel protection area, preferably close to the first electrical system, with an air-breathing fuel cell close to the transition to the midships vessel protection area.

If required, double-walled bulk heads can be arranged between the adjacent compartments with the gas turbines and the generators of the second electrical system in the midships vessel protection area SSB-2.

Furthermore, it is possible for the gas turbines in their compartment and the generators in their compartment of the second electrical system each to be separated from one another by a central longitudinal bulk head in the midships protection area SSB-1.

The POD propulsion segment of the "corvette" vessel-type equipment system is advantageously designed for a speed of up to approximately 12 to 14 knots, and is supplied with electrical power in this operating state, which corresponds to an environmentally friendly and low-emission continuous cruise speed, by means of the two fuel cell segments.

In contrast, according to a further advantageous embodiment of the "corvette" vessel-type equipment system according to the invention, the waterjet propulsion segments are designed for a top speed of the "corvette" vessel-type equipment system which may be around a speed of approximately 30 knots, and they are supplied with electrical power by means of the two gas-turbine-power generators in this operating state.

For low-emission acceleration of the waterjet propulsion segments, they can advantageously be supplied with electrical power from at least one fuel cell segment until the power limit of the fuel cell segment or segments is reached.

In order to optimize the speed which the "corvette" vessel-type equipment system can achieve, and its power consumption, the electrical power which is produced by way of the power generator segment is expediently distributed for optimized efficiency by means of the power distribution segment and energy management for an automation carrier system vessel when the POD propulsion segment and the waterjet propulsion segments are being operated simultaneously, when speeds of more than 35 knots can be achieved.

The power distribution segment of the "corvette" vessel-type equipment system is advantageously subdivided into a propulsion network which is fed from fuel cells and by which the POD propulsion segment can be supplied with electrical power, and a generator-fed propulsion network, by which the waterjet propulsion segments can be supplied with electrical power.

The propulsion network which is fed from fuel cells advantageously has a stern-end network section which is essentially associated with the stern-end vessel protection area, and a bow-end network section, which is essentially associated with the third vessel protection area and which can be connected to the stern-end network section via suitable coupling elements.

According to a further advantageous embodiment of the "corvette" vessel-type equipment system according to the invention, its generator-fed propulsion network is essentially associated with the midships vessel protection area and can be connected to the propulsion network which is fed from fuel cells by way of suitable coupling elements. This considerably increases the survivability of both the power generator segments and of the propulsion segment of the "corvette" vessel-type equipment system which is supplied with electrical power from it.

If an auxiliary propulsion system which is arranged in the bow-end vessel protection area can be supplied with electrical power by way of the bow-end network section of the propulsion network which is fed from fuel cells, this auxiliary propulsion system in conjunction with the thruster segment (which is arranged in the bow end) of the propulsion system can ensure that the "corvette" vessel type equipment system according to an embodiment of the invention still remains mobile and maneuverable when heavily damaged, even if at a comparatively low speed.

On-board network loads such as weapon system units in the "corvette" vessel-type equipment system according to the invention can advantageously be supplied with electrical power from the entire power generator segment by way of the propulsion network which is fed from fuel cells.

In order to connect the existing vessel operating engineering to the two propulsion networks, it may be expedient to provide low-voltage electrical systems which are arranged in different vessel protection areas, to both of which the propulsion network is connected and which can be connected to one another by way of suitable coupling elements.

In order to optimize the operation of the power generator segment, the power distribution segment and the propulsion segment of the "corvette" vessel-type equipment system, its automation segment, which is in the form of an automation carrier system vessel, advantageously has an automation center, which has a large number of terminals and a terminal bus, and two or more servers, which are connected to the terminal bus and to a system bus and to which control networks which are associated with different vessel protection areas are connected.

A first control network, which is essentially associated with the stern-end vessel protection area, is expediently used to control the POD propulsion segment and the vessel operating engineering which is provided in the stern-end first vessel protection area.

A second control network, which is essentially associated with the midships vessel protection area, can be used to control the gas-turbine-powered generators, the two waterjet propulsion segments and the vessel operating engineering which is provided in the midships vessel protection area.

In a corresponding manner, a third control network, which is essentially associated with the third and bow-end vessel protection area, can be used to control the two fuel-cell segments, the diesel reformer, the thruster segment and the vessel operating engineering which is provided in the third and bow-end vessel protection area.

BRIEF DESCRIPTION OF THE DRAWINGS

The invention will be explained in more detail in the following text using one exemplary embodiment and with reference to the drawing, in which.

DETAILED DESCRIPTION OF THE EXAMPLE EMBODIMENTS

Figure 1:
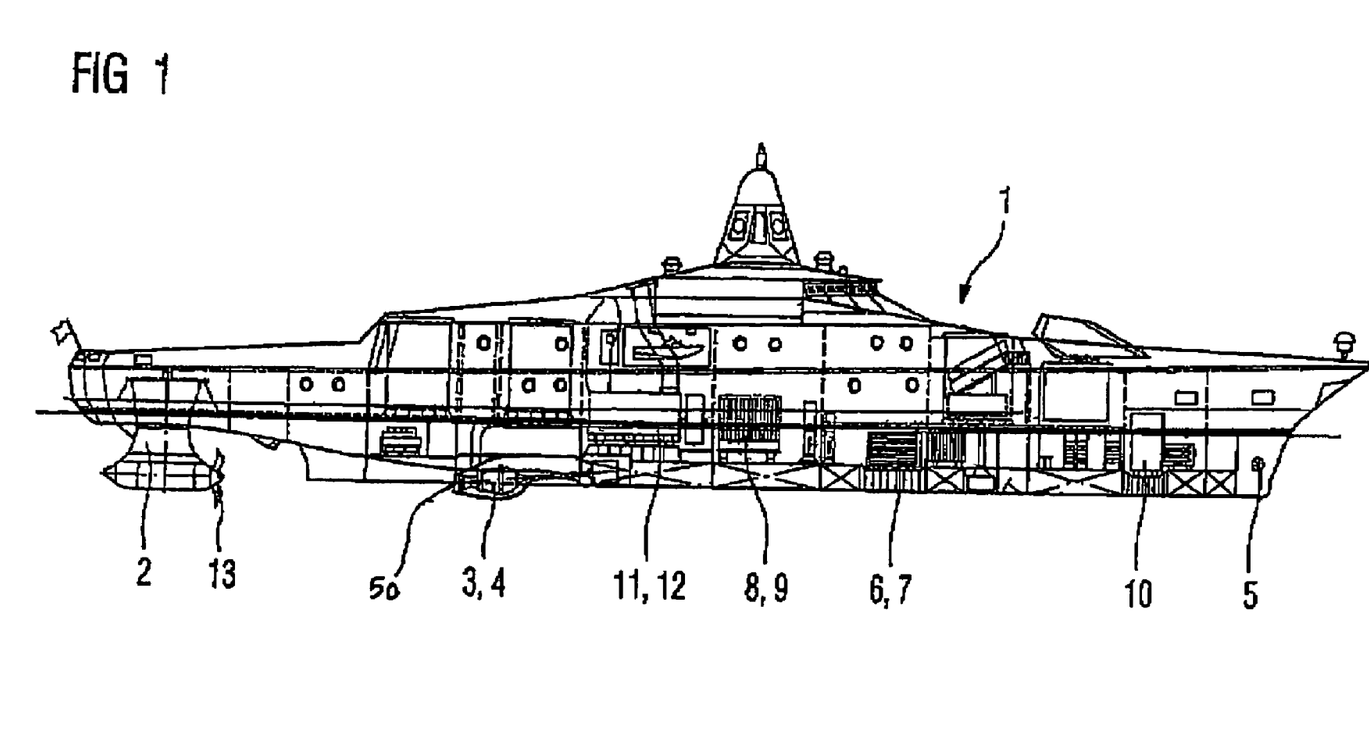
FIG. 1 shows a longitudinal section illustration of one embodiment of a "corvette" vessel-type equipment system according to the invention.
Figure 2:
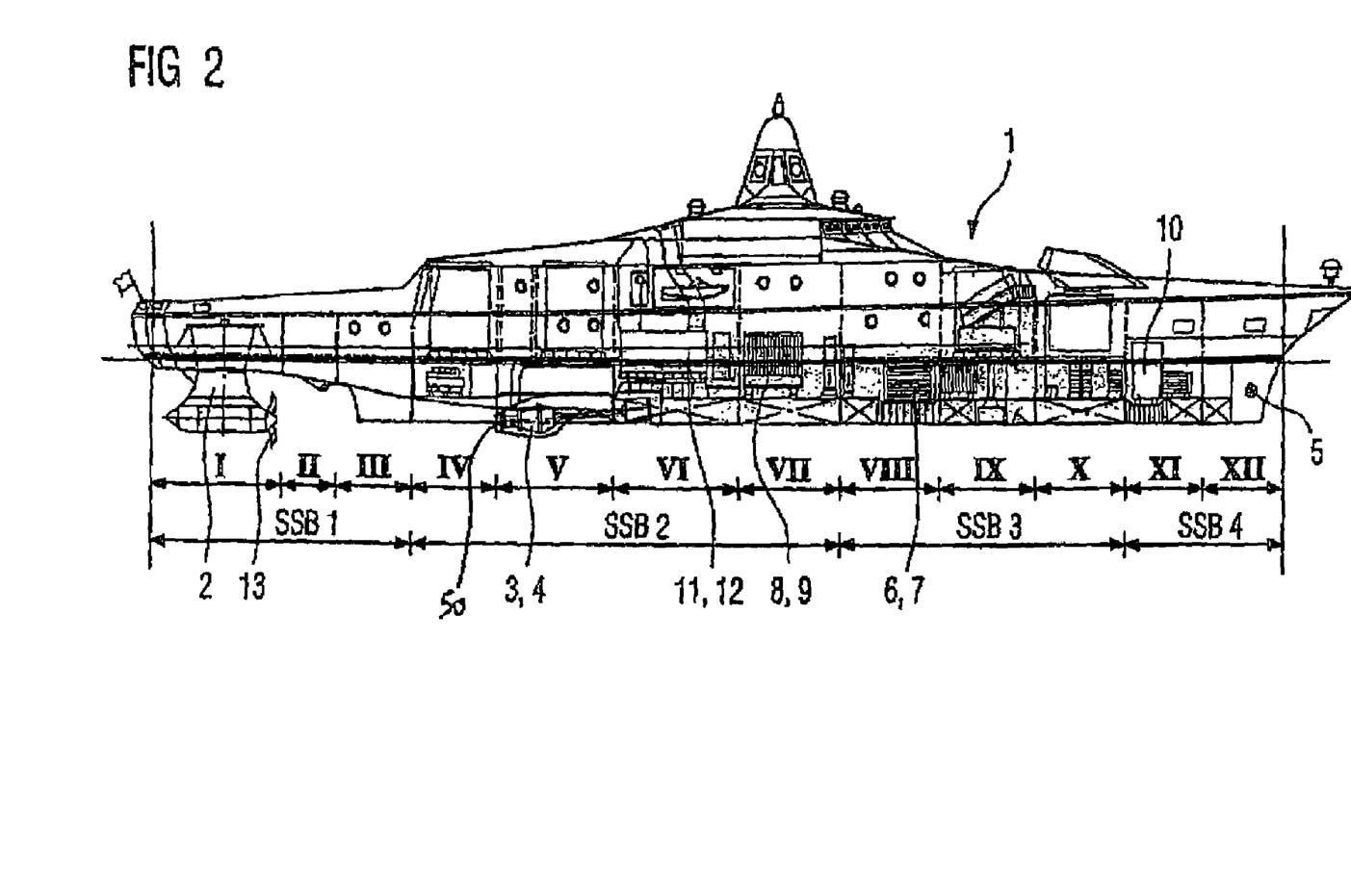
FIG. 2 shows an illustration, corresponding to FIG. 1, of the "corvette" vessel-type equipment system according to an embodiment of the invention, with its vessel protection areas and compartments.

One embodiment of a "corvette" vessel-type equipment system according to the invention, as illustrated in the form of a longitudinal section illustration in FIGS. 1 and 2, has a vessel hull 1 which is designed and has dimensions corresponding to the "corvette" vessel-type equipment system.

The "corvette" vessel-type equipment system is intended in particular to be primarily involved in waterways close to the coast in a littoral warfare operating group.

In the illustrated exemplary embodiment, the "corvette" vessel-type equipment system has an overall length of approximately 94 m, a keel waterline length of approximately 86 m, an overall width—amidships—of approximately 15 m, a keel waterline width of approximately 13.5 m, a maximum width—at the stern—of approximately 17 m, a design draft of approximately 3.8 m, a maximum draft of approximately 6.0 m, measured at a propeller tip of the propulsion segment, a type displacement of approximately 2000 tonnes, and a maximum speed of more than approximately 35 knots.

Standard equipment segments, such as a power generator segment, a power distribution segment, a propulsion segment and an automation segment including standard units and components are arranged in the vessel hull 1, in accordance with the requirements for the "corvette" vessel-type equipment system.

The individual units, by which the segments are formed or from which they are composed, are designed as standardized units which can be prefabricated. Instead of being used in the "corvette" vessel-type equipment system described in the following text, they can also be used in conjunction with other vessel-type equipment systems.

In the illustrated embodiment of a "corvette" vessel-type equipment system, with its type displacement of approximately 2000 tonnes and an assumed maximum speed of more than 35 knots, the propulsion segment includes a POD propulsion segment 2. It further includes two waterjet propulsion segments 3, 4. The POD propulsion segment 2 and the two waterjet propulsion water segments 3, 4 form a so-called COPAW (Combined Pod and Waterjet) propulsion system which, furthermore, is designed to be completely electrical. The propulsion segment also includes a thruster segment 5, which is arranged close to the bow of the vessel hull 1.

The POD propulsion segment 2 is a lightweight POD propulsion system designed for naval purposes and with a power of 7 MW. This POD propulsion system 2 allows the "corvette" vessel-type equipment system to travel at a speed of up to 12 to 14 knots, thus providing a low-noise and low-emission continuous cruise speed. The lightweight POD propulsion system 2 is equipped with an electric motor with windings composed of high-temperature superconductors. This allows the POD propulsion system 2 to have a weight of 65 tonnes for the given power level of 7 MW.

The electrical power for the POD propulsion system 2 is produced by two fuel-cell segments 6, 7, which will be described later. These fuel-cell segments 6, 7 are designed for the speed range described above.

In the course of current investigations, it has been found that a propulsion profile appropriate for the continuous cruise speed described above can be maintained over approximately 60% of the lifetime or time-in-motion of the "corvette" vessel-type equipment system.

For the speed range above 12 to 14 knots, the propulsion segment has the two waterjet propulsion segments 3, 4 mentioned above. Each of these two waterjet propulsion segments 3, 4 is in the form of a twin-waterjet propulsion system. In the illustrated exemplary embodiment, they are in the form of a twin-waterjet propulsion system with a power of 14 MW. The two twin-waterjet propulsion systems 3, 4 allow the "corvette" vessel-type equipment system to reach a speed of up to 30 knots. Each of the two twin-waterjet propulsion systems 3, 4 has two electric motors with windings composed of high-temperature superconductors and each with a power of 7 MW. The electrical power for operation of the two twin-waterjet propulsion systems 3, 4 is produced by two generator segments 8, 9, which will be described later.

The propulsion profile with the "corvette" vessel-type equipment system traveling at a speed of more than 12 to 14 knots and up to 30 knots is used for about 30% of the lifetime or time-in-motion of the "corvette" vessel-type equipment system.

In a speed range which is above 30 knots and may extend up to above 35 knots, the POD propulsion system 2 is connected to the two waterjet propulsion systems 3, 4. In this operating state, both the two generator segments 8, 9 and the two fuel-cell segments 6, 7, which have already been mentioned above, are used to produce the electrical power.

The propulsion profile in this maximum speed range is used for approximately 10% of the lifetime or time-in-motion of the "corvette" vessel-type equipment system.

The energy generator segment of the "corvette" vessel-type equipment system described above is based on gross power generation of approximately 44 MW for the entire on-board electrical power supply. The net power level of approximately 37 MW which results from this is used for operation of the COPAW propulsion system described above which requires approximately 35 MW for top speed in the maximum speed range above 35 knots, with approximately 1.5 MW being required for on-board operation including the weapon and electronic systems, with a margin being provided of 0.5 MW for retrofits, other missions, and armaments with non-lethal or high-energy laser weapons etc.

The energy generator segment includes the two fuel-cell segments 6, 7 and generator segments 8, 9 which have already been mentioned above.

The fuel-cell segments 6, 7 are in the form of air-breathing PEM fuel cells. Each of the two PEM fuel cells 6, 7 has a net power of approximately 4.5 MW, which corresponds to a gross power of approximately 6 MW. The air-breathing PEM fuel cells 6, 7 are used to provide electrical power for the low-noise and environmentally friendly operating state up to a speed of approximately 12 to 14 knots, in which the POD propulsion system 2 is supplied with electrical power from the fuel cells 6, 7 that have been mentioned.

A diesel reformer 10 with a power of approximately 9 MW is provided for supplying hydrogen to the fuel cells 6, 7.

Figure 5:
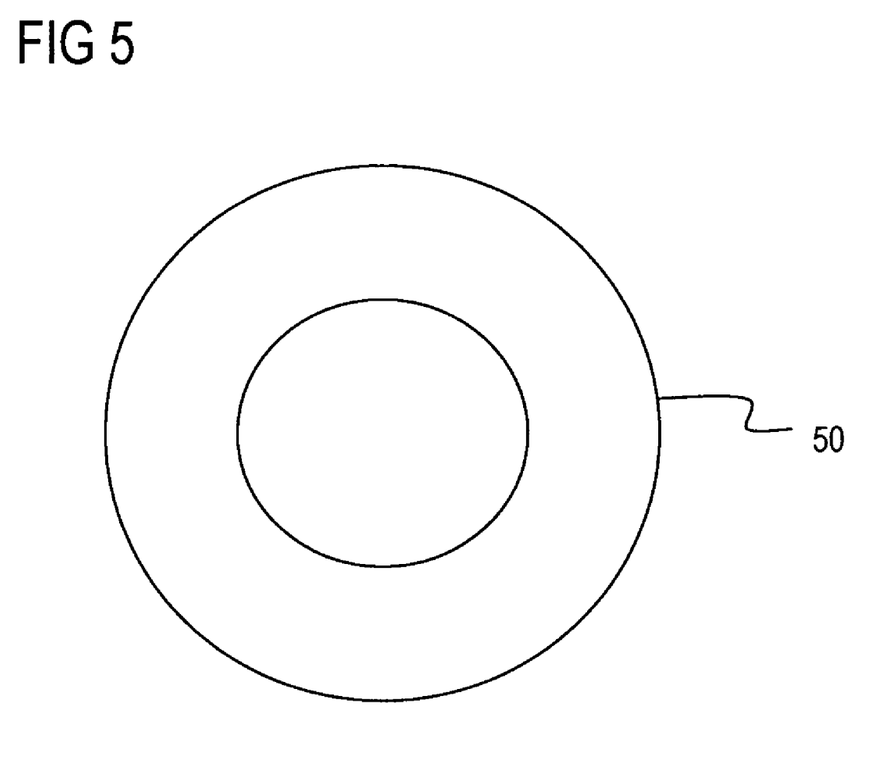
FIG. 5 shows an illustration of an exhaust nozzle in a coaxial configuration according to an embodiment of the invention.

In one embodiment, the waterjet propulsion segments 3, 4 may be equipped with a nozzle segment 50 in a coaxial configuration as illustrated in FIG. 5. A nozzle segment 50 in a coaxial configuration may dissipate exhaust gases from gas turbines, diesel engines, or other internal combustion engines, for propulsion of electrical power generating machines and/or further systems through the waterjet propulsion segments into the water surrounding the "corvette" vessel-type equipment system, and may do so in such a manner that the detectable thermal emissions from the "corvette" vessel-type equipment system are reduced.

Alternatively, instead of a single diesel reformer 10 with a power of approximately 9 MW, it is also possible to choose an embodiment in which two diesel reformers are provided, each of which has a power of approximately 4.5 MW.

The two generator segments 8, 9 of the power generator segment are each driven by means of a gas turbine 11, 12. The two generator segments 8, 9 are in the form of three-phase generators with windings composed of high-temperature superconductors, and each have a power of approximately 16 MW, which is sufficient to supply electrical power to the four electric motors for the two twin-waterjet propulsion systems 3, 4. The use of windings composes of high-temperature superconductors allows the generators 8, 9 to have considerably smaller physical sizes and weights than conventionally produced generators of the corresponding power class.

As can be seen in particular from FIG. 2, the vessel hull 11 of the "corvette" vessel-type equipment system is subdivided, in the embodiment illustrated here, into four vessel protection areas, specifically the stern-end vessel protection area SSB-1, the midships vessel-protection area SSB-2, the third vessel protection area SSB-3, and the bow-end vessel protection area SSB-4.

The stern-end vessel protection area SSB-1, in the illustrated exemplary embodiment of the "corvette" vessel-type equipment system, includes the compartments I-III, the midships vessel protection area SSB-2 includes the compartments IV-VII, the third vessel protection area SSB-3 includes the compartments VIII-X, and the bow-end vessel protection area SSB-4 includes the compartments XI and XII.

In the illustrated exemplary embodiment of the "corvette" vessel-type equipment system, the lightweight POD propulsion system 2 is arranged in the stern-end vessel protection area SSB-1, that is to say astern vessel, approximately 6 meters away from the sternpost, amidships, to be precise in the compartment I.

The distance between the center of the lightweight POD propulsion system 2 and the tip of its traction propeller 13 on the one hand and the nozzle outlet openings 50 of the pods for the two twin-waterjet propulsion systems 3, 4 on the other hand is approximately 20 m or approximately 19 m, seen in the longitudinal direction of the vessel hull 1.

As has already been mentioned above, the lightweight POD propulsion system 2, which has a weight of approximately 65 tonnes, is arranged together with units associated with it. These can include converters, controllers, etc (which themselves have a weight of approximately 10 to 15 tonnes) effectively arranged at the sternpost. The arrangement of a weight of approximately 75-80 tonnes effectively at the sternpost means that, in order to increase the buoyancy displacement in the stern area, that the vessel structure is designed to broaden from amidships, to be precise from a width of approximately 15 m amidships to a width of approximately 17 m at the stern of the ship.

This results in a refinement of the stern area of the vessel hull 1 in which the vessel forms an arrow head (sparrow-hull form). Furthermore, skid-like profiles are provided in the stern area. The arrow head vessel shape (sparrow-hull form) can be configured using the so-called sparrow-MONO-hull design.

Furthermore, the structure of the stern area of the vessel hull 1 is designed and conceived to be sufficiently strong that the axial forces which occur during operation of the lightweight POD propulsion system 2 can be coped with.

A first electrical system comprises the two fuel cells 6, 7 and is arranged in the compartment VIII in the third vessel protection area SSB-3, that is to say close to the transition to the midships vessel protection area SSB-2.

The distance between the center of thte lightweight POD propulsion system 2 and the tip of its traction propeller 13 on the one hand and the nozzle outlet opening 50 of the pods for the two twin-waterjet propulsion system 3, 4 on the hand is approximately 20 m or approximately 19 m, seen in the longitudinal directional of the vessel hull 1.

Alternatively, it is possible to arrange only one fuel cell segment in the compartment VIII in the third vessel protection area SSB-3, in which case the second fuel cell segment can then be arranged in the midships vessel protection area SSB-2, to be precise preferably in its compartment V.

The two gas turbines 11, 12, which are connected via step-down gearboxes to the two generators 8, 9, form a second electrical system together with them, which is subdivided into a stern-end electrical system section with the two gas turbines 11, 12, and a bow-end electrical system section with the two generators 8, 9.

The stern-end electrical system section includes the two gas turbines 11, 12 and also includes the step-down gearbox. It is arranged in the midships vessel protection area SSB-2, to be precise in its compartment VI. The bow-end electrical system section, which accommodates the two generators 8, 9 with windings composed of high-temperature superconductors, is arranged in the adjacent compartment VII in the same vessel protection area SSB-2. The compartments VI and VII are separated from one another by double-walled bulk heads. Furthermore, the stern-end electrical system section which accommodates the two gas turbines 11, 12, and the bow-end electrical system section which accommodates, the two generators 8, 9, can each be subdivided by central longitudinal bulk heads.

In the embodiment of the "corvette" vessel-type equipment system according to the invention as illustrated in FIGS. 1 and 2, a diesel reformer center, in which the single 9 MW diesel reformer 10 is arranged, is accommodated in the bow-end vessel protection area SSB-4, to be precise in its compartment XI, close to the transition to the third vessel protection area SSB-3.

Alternatively, it is possible to provide two diesel reformer centers, with one diesel reformer with a power of 4.5 MW then being accommodated in each of these two diesel reformer centers. These two diesel reformer centers can then, for example, be accommodated in the compartment VI in the midships vessel protection area SSB-2, and in the compartment XI in the bow-end vessel protection area SSB-4.

Alternatively, it is possible to arrange one of these two diesel reformer centers together with one fuel cell in the compartment VIII in the third vessel protection area SSB-3, and the other diesel reformer center together with the further fuel cell in the compartment V in the midships vessel protection area SSB-2, if the two fuel cells are arranged correspondingly separately from one another.

The physical distribution of the electrical systems and of the diesel reformer center or centers in different vessel protection areas results in maximum survivability of the "corvette" vessel-type equipment system.

It should be noted that the diesel reformer 10 is arranged in those areas of the vessel hull 1 whose height normally corresponds to two deck levels, since, nowadays, a diesel reformer 10 such as this has a height of approximately 3.5 m.

The physical separation of the POD propulsion system 2 from the two waterjet propulsion systems 3, 4, which are themselves physically separated from one another, in conjunction with the redundant power supply by means of the described electrical systems and diesel reformer centers, which are distributed between three vessel protection areas SSB-2, SSB-3 and SSB-4 and accommodate the two fuel cells 6, 7, the two gas-turbine-powered generators 8, 9 and the diesel reformer 10, results in a considerable improvement in the survivability of the propulsion segment of the "corvette" vessel-type equipment system.

In particular, any desired control and steering maneuvers can be carried out by way of the POD propulsion system 2 and/or by way of the two waterjet propulsion systems 3, 4, in particular in conjunction with the thruster segment 5, which is in the form of a 0.3 MW bow jet thruster.

Both the POD propulsion system 2 and the two waterjet propulsion systems 3, 4 have continuously variable power outputs. Stopping and astern maneuvers can be provided not only by thrust vectoring of the waterjet propulsion systems 3, 4 but also by rotation of the POD propulsion system 2.

Figure 3:
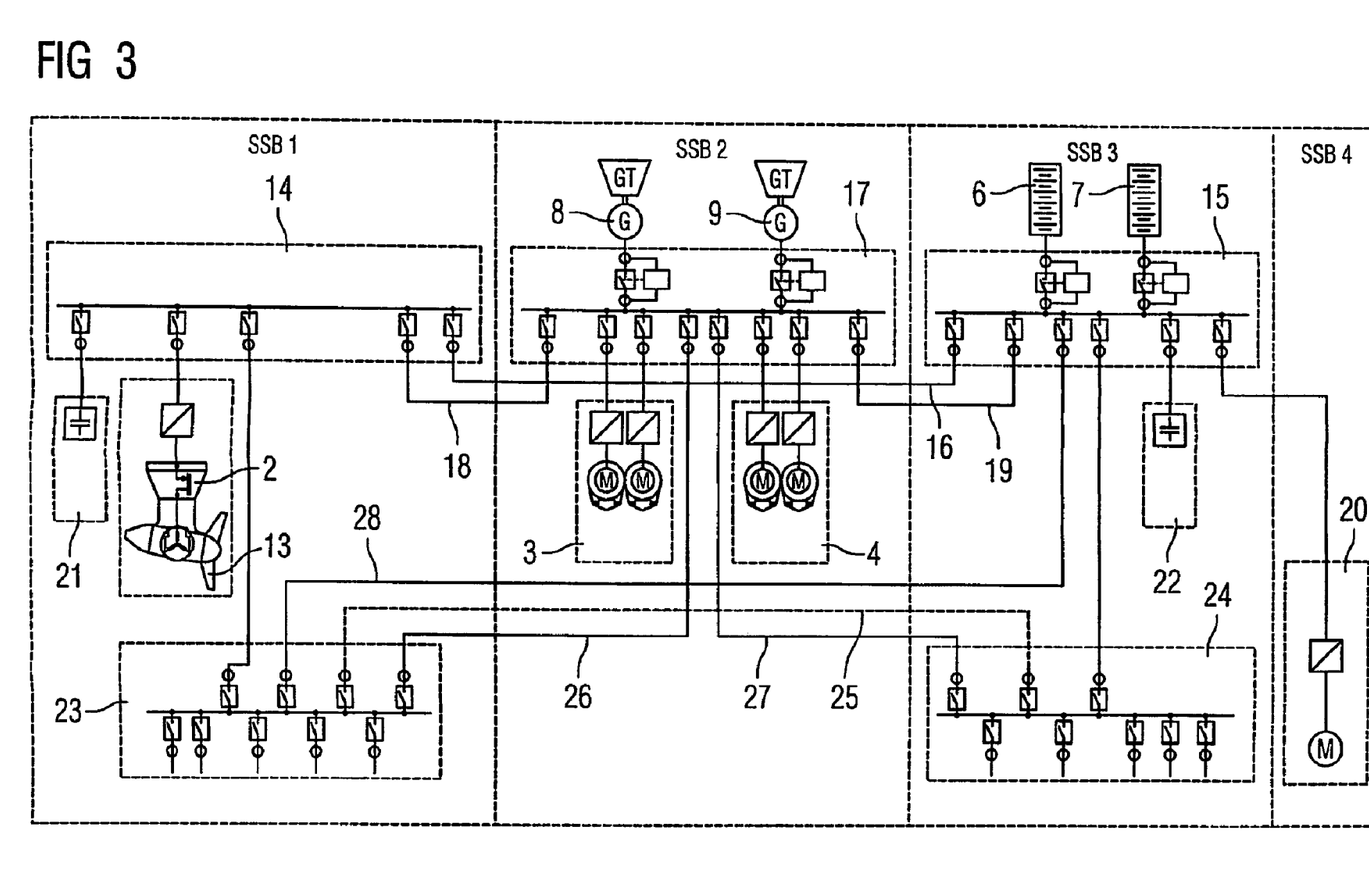
FIG. 3 shows an outline illustration of the power distribution and of the on-board power supply for the "corvette" vessel-type equipment system according to an embodiment of the invention as illustrated in FIGS. 1 and 2.

The combination of the power generation from the fuel cells 6, 7 and from the gas-turbine-powered generators 8, 9, and the inclusion of two different voltage systems, which results from this, in a DC network and an AC network for the power distribution system for the "corvette" vessel-type equipment system, as shown in FIG. 3, results in the following configuration:

The power distribution segment includes a propulsion network 14, 15 which is fed from fuel cells and which, in the illustrated exemplary embodiment as is shown in FIG. 3, is subdivided into astern-end network section 14 and a bow-end network section 15.

The two network sections 14, 15 of the propulsion network which is fed from fuel cells can be connected to one another via suitable coupling elements 16.

The bow-end network section 15 is essentially associated with the third vessel protection area SSB-3. This network section 15 is supplied from the two fuel cells 6, 7, which are arranged at the bow end in the first electrical system in the vessel protection area SSB-3 in the embodiment of the "corvette" vessel-type equipment system shown in the figures.

The stern-end network section 14 is essentially associated with the stern-end vessel protection area SSB-1. When the "corvette" vessel-type equipment system is traveling at cruise speed of up to 12 to 14 knots, the POD propulsion system 2 is supplied with electrical power from this network section 14. The two fuel cells 6, 7, which in the illustrated exemplary embodiment are arranged in the first electrical system in the vessel protection areas SSB-3, feed this network section 14 via the bow-end network section 15 and the coupling elements 16.

Furthermore, a generator-fed propulsion network 17 is provided. Further, it is essentially associated with the midships vessel protection area SSB-2. The generators 8, 9, which are provided in the second electrical system, feed this second propulsion network. The generator-powered propulsion network 17 is used in the "corvette" vessel-type equipment system speed range between 12 to 14 knots and approximately 30 knots to supply electrical power to the two waterjet propulsion systems 3, 4. The generator-powered propulsion network 17 can be connected by way of suitable coupling elements 18, 19 to the two network sections 14, 15 of the propulsion network which is powered by fuel cells.

An auxiliary propulsion system 20, which is arranged in the bow-end vessel protection area SSB-4 is supplied with electrical power by way of the propulsion network which is powered by fuel cells, in particular by its bow-end network section 15. The thruster segment 5 is driven by way of the auxiliary propulsion system 20. In one possible refinement of the thruster segment 5, for example in the form of a retractable stirring propeller with the functions of a so-called "coming home" propulsion system, in which this is adequate in the event of failure of the other units in the propulsion segment, to move and to maneuver the "corvette" vessel-type equipment system at a comparatively low speed in specific circumstances.

Furthermore, FIG. 3 shows a weapon system unit 21, which is arranged in the stern area, and a weapon system unit 22, which is arranged in the bow area, which units are associated with the vessel protection areas SSB-1 and SSB-3, respectively, and are supplied with electrical power as appropriate from the stern-end network section 14 and, respectively, from the bow-end network section 15 of the propulsion network which is powered by fuel cells.

Furthermore, a low-voltage electrical system 23 or 24, respectively, is provided in the stern-end vessel protection area SSB-1 and in the third vessel protection area SSB-3. The low-voltage electrical system 23, provided in the stern-end vessel-protection area SSB-1, is connected directly to the stern-end network section 14, while the low-voltage electrical system 24 which is provided in the third vessel protection area SSB-3 is connected directly to the bow-end network section 15 of the propulsion network which is powered by fuel cells.

The two low-voltage electrical systems 23, 24 are connected to one another by way of a suitable coupling element 25.

Furthermore, the two low-voltage electrical systems 23, 24 are each connected to the generator-powered propulsion network 17 by way of suitable coupling elements 26, 27. Furthermore, the low-voltage electrical system 23 which is provided in the stern-end vessel protection area SSB-1 is directly connected by way of further suitable coupling elements 28 to the bow-end network section 15 of the propulsion network 14, 15, which is powered by fuel cells.

Figure 4:
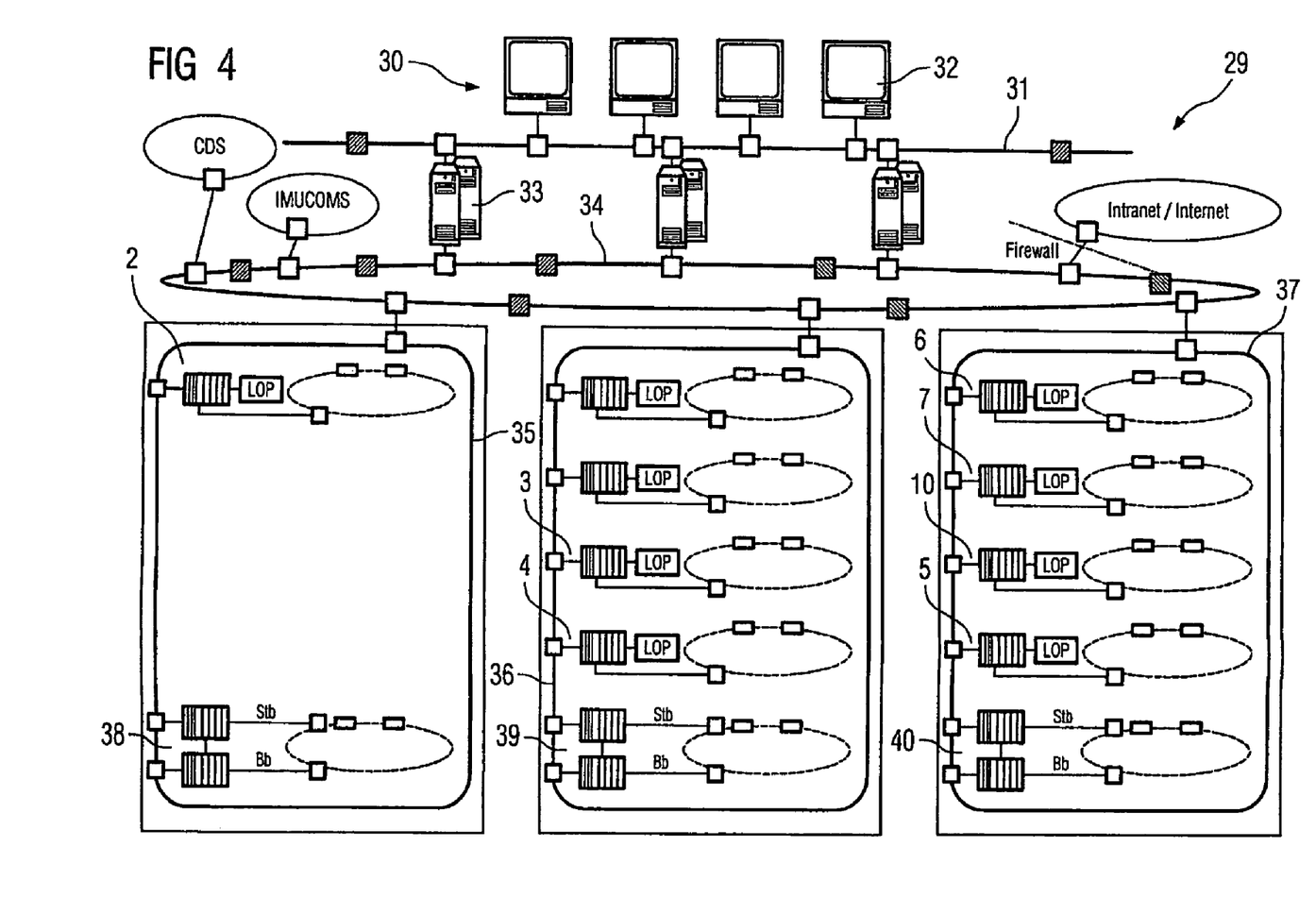
FIG. 4 shows an automation carrier system vessel for the "corvette" vessel-type equipment system according to an embodiment of the invention, as illustrated in FIGS. 1 and 2.

Intelligent energy management is provided in order to make it possible to provide the power distribution of the electrical power that is required by the COPAW propulsion system, between the POD propulsion system 2 and the two waterjet propulsion systems 3, 4 based on optimized efficiency, which intelligent energy management is provided by the automation carrier system vessel 29, which is shown in principle in FIG. 4, and forms the automation segment of the "corvette" vessel-type equipment system. This automation carrier system vessel 29 includes an automation center 30 which, in the illustrated exemplary embodiment, has four terminals which are connected to one another via a terminal bus 31.

This terminal bus 31 is connected to two or more redundant servers 33, which are connected on the other side to a system bus 34. The servers 33 have access via the system bus 34 to control networks 35, 36, 37, of which there are three in the illustrated exemplary embodiment, and of which the control network 35 is associated with the stern-end vessel protection area SSB-1, the control network 36 is associated with the midships vessel protection area SSB-2, and the control network 37 is associated with the third and the bow-end vessel protection areas SSB-3 and SSB-4.

The control network 35 is used to monitor and control the POD propulsion system 2 and the vessel operating engineering 38, which is provided in the stern-end vessel protection area SSB-1.

The two gas-turbine-powered generators 8, 9 in the second electrical system, the two waterjet propulsion systems 3, 4 and the vessel operating engineering 39 which is provided in the midships vessel protection area SSB-2 are controlled and monitored by way of the control network 36.

The two fuel cells 6, 7 which are arranged in the first electrical system, the diesel reformer 10, the thruster segment 5 and the vessel operating engineering 40, which is provided in the third vessel protection area SSB-3 and in the bow-end vessel protection area SSB-4, are controlled and monitored in a corresponding manner via the control network 37.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A corvette vessel-type equipment system, comprising:
   a vessel hull, matched to the corvette vessel-type equipment system on a size and requirement-specific basis, and having a plurality of vessel protection areas;
   standard equipment segments, formed from standard units and components arranged in accordance with the requirements in the vessel hull of the corvette vessel-type equipment system, and installable in vessel hulls of different vessel-type equipment systems;
   a power generator segment including a first electrical system, the first electrical system including generators and internal combustion engines, by which the generators can be driven, arranged in adjacent compartments in one of the vessel protection areas; and
   a propulsion segment including a combination of
      a POD propulsion segment in the form of a completely electrical lightweight POD propulsion system, having a power of up to 8 MW, and
      two waterjet propulsion segments in the form of twin waterjet propulsion systems, having a power of up to 16 MW.

2. The corvette vessel-type equipment system as claimed in claim 1, wherein a propulsion segment includes a thruster segment.

3. The corvette vessel-type equipment system as claimed in claim 1, wherein electric motors in at least one of a POD propulsion segment, a waterjet propulsion segment and a thruster segment are designed with windings composed of high-temperature superconductors.

4. The corvette vessel-type equipment system as claimed in claim 1, wherein electric motors in at least one of a POD propulsion segment, waterjet propulsion segments and a thruster segment are in the form of synchronous machines with a field winding composed of high-temperature superconductors, and wherein the stator windings are in the form of air-gap windings.

5. The corvette vessel-type equipment system as claimed in claim 1, wherein waterjet propulsion segments are equipped with a coaxial exhaust-gas nozzle segment.

6. The corvette vessel-type equipment system as claimed in claim 1, wherein, in the longitudinal direction, a distance between the center of the POD propulsion segment and a nose of a traction propeller of the POD propulsion segment, and the nozzle outlet openings of the pods of waterjet propulsion segments, is at least 15 m or 14 m.

7. The corvette vessel-type equipment system as claimed in claim 1, wherein the vessel hull is designed to broaden in the stem area of the vessel from the vessel center so that the weight of the POD propulsion segment and the weight of the associated equipment can be absorbed by way of it, with the vessel hull having, in the stem area of the vessel, a structure whose strength is sufficient to absorb the axial forces which occur as a result of the operation of the POD propulsion segment.

8. The corvette vessel-type equipment system as claimed in claims 1, wherein the power generator segment is formed from a combination of at least one of two fuel cell segments, each having a power of approximately 4.5 MW net or 6 MW gross, and generator segments, each having a power of approximately 16 MW.

9. The corvette vessel-type equipment system as claimed in claim 8, wherein the generator segments include generators having windings composed of a high-temperature superconductor.

10. The corvette vessel-type equipment system as claimed in claim 8, wherein the generator segments include generators in the form of synchronous machines with a field winding composed of high-temperature superconductors, with the stator windings being in the form of air-gap windings.

11. The corvette vessel-type equipment system as claimed in claim 8, wherein the two fuel cell segments include two air-breathing PEM fuel cells, associated, in order to supply them with hydrogen, with a diesel reformer with a power of approximately 9 MW.

12. The corvette vessel-type equipment system as claimed in claim 8, wherein the two fuel cell segments include two air-breathing PEM fuel cells associated, in order to supply them with hydrogen, with two diesel reformers, each having a power of approximately 4.5 MW.

13. The corvette vessel-type equipment system as claimed in claim 8, wherein a second electrical system with two air-breathing PEM fuel cells is arranged in a third ship protection area SSB-3 which is arranged between a bow-end vessel protection area SSB-4 and a vessel protection area SSB-2, close to the transition to the midships vessel protection area SSB-2.

14. The corvette vessel-type equipment system as claimed in claim 8, wherein a second electrical system having an air-breathing PEM fuel cell in a third vessel protection area SSB-3 is arranged between a bow-end vessel protection area SSB-4 and a midships vessel protection area SSB-2, close to the transition to the midships vessel protection area SSB-2, and a further electrical system with an air-breathing PEM fuel cell is arranged in the midships vessel protection area SSB-2.

15. The corvette vessel-type equipment system as claimed in claim 8, wherein a diesel reformer center with a diesel reformer is arranged in a bow-end vessel protection area SSB-4.

16. The corvette vessel-type equipment system as claimed in claim 8, wherein a diesel reformer center with a diesel reformer is arranged in a midships vessel protection area SSB-2.

17. The corvette vessel-type equipment system as claimed in claim 8, wherein a first diesel reformer center with a diesel reformer is arranged in a bow-end vessel protection area SSB-4, and a second diesel reformer center with a diesel reformer is arranged in a midships vessel protection area SSB-2.

18. The corvette vessel-type equipment system as claimed in claim 8, wherein a first diesel reformer center with a diesel reformer is arranged in a midships vessel protection area SSB-2, and a second diesel reformer center with a diesel reformer is arranged in a third vessel protection area SSB-3, with an air-breathing fuel cell close to the transition to the midships vessel protection area SSB-2.

19. The corvette vessel-type equipment system as claimed in claim 1, wherein the power generator segment is distributed over a number of ship protection areas SSB-2, SSB-3 and SSB-4 in the corvette vessel type equipment system.

20. The corvette vessel-type equipment system as claimed in claim 1, wherein the first electrical system includes one to four, generators and includes one to four, internal combustion engines, by which the generators can be driven, arranged in adjacent compartments VI, VII in midships vessel protection area SSB-2.

21. The corvette vessel-type equipment system as claimed in claim 20, wherein double-walled bulk heads are arranged between the adjacent compartments VI, VII with the internal combustion engines and the generators of the first electrical system in the midships vessel protection area SSB-2.

22. The corvette vessel-type equipment system as claimed in claim 20, wherein the internal combustion engines in the compartment VI and the generators in the compartment VII for the first electrical system are each separated from one another by a central longitudinal bulk head in the midships vessel protection area SSB-2.

23. The corvette vessel-type equipment system as claimed in claim 1, wherein the internal combustion engines for the first electrical system are gas turbines.

24. The corvette vessel-type equipment system as claimed in claim 1, wherein a POD propulsion system is designed for the vessel-type equipment system to travel at a continuous cruise speed of approximately 12 to 14 knots, and can be supplied with electrical power in this operating state by way of two fuel cell segments.

25. The corvette vessel-type equipment system as claimed in claim 1, wherein waterjet propulsion segments are designed for the corvette vessel-type equipment system to travel at a top speed of approximately 30 knots, and can be supplied, with electrical power in this operating state by way of the two gas-turbine-powered generators.

26. The corvette vessel-type equipment system as claimed in claim 1, wherein waterjet propulsion segments can be supplied with electrical power from at least one of two fuel cell segments until the power limit of at least one of the fuel cell segments is reached in order to start up these waterjet propulsion segments with low emissions.

27. The corvette vessel-type equipment system as claimed in claim 1, wherein the system achieves speeds of more than 35 knots by operating a POD propulsion system and a waterjet propulsion segments simultaneously, in which case the distribution of the electrical power which is produced by way of the power generator segment can be achieved with optimized efficiency by way of a power distribution segment and energy management for an automation carrier system vessel.

28. The corvette vessel-type equipment system as claimed in claim 1, wherein a power distribution segment is a propulsion network which is fed from fuel cells and by which a POD propulsion segment can be supplied with electrical power, and has a generator-fed propulsion network, by which the waterjet propulsion segments can be supplied with electrical power.

29. The corvette vessel-type equipment system as claimed in claim 28, wherein the propulsion network which is fed from fuel cells has a stem-end network section which is essentially associated with a stem-end vessel protection area SSB-1, and has a bow-end network section which is essentially associated with a third vessel protection area SSB-3 and can be connected to the stem-end network section via suitable coupling elements.

30. The corvette vessel-type equipment system as claimed in claim 29, wherein an auxiliary propulsion system, which is arranged in a bow-end vessel protection area SSB-4, can be supplied with electrical power by way of the bow-end network section of the propulsion network which is fed by way of fuel cells.

31. The corvette vessel-type equipment system as claimed in claim 28, wherein the generator-fed propulsion network is essentially associated with a midships vessel protection area SSB-2 and can be connected to the propulsion network, which is fed by way of fuel cells, by way of suitable coupling elements.

32. The corvette vessel-type equipment system as claimed in claim 28, wherein on-board network loads can be supplied with electrical power from the entire power generation segment, advantageously by way of the propulsion network which is fed by way of fuel cells.

33. The corvette vessel-type equipment system as claimed in claim 28, further comprising low-voltage electrical systems, arranged in various vessel protection areas SSB-1, SSB-3 can be connected to both propulsion networks and can be connected to one another by way of suitable coupling elements.

34. The corvette vessel-type equipment system as claimed in claim 1, wherein an automation segment includes an automation center which has a large number of terminals and a terminal bus, and has two or more servers, which are connected to the terminal bus and to a system bus, and to which control networks which are associated with different vessel protection areas SSB-1, SSB-2, SSB-3 and SSB-4 are connected.

35. The corvette vessel-type equipment system as claimed in claim 34, further comprising a first control network, essentially associated with a stem-end vessel protection area SSB-1 and with which a POD propulsion segment and a vessel operating engineering, provided in the stem-end vessel protection area SSB-1, are associated.

36. The corvette vessel-type equipment system as claimed in claim 35, further comprising a second control network, essentially associated with a midships vessel protection area SSB-2 and with which two gas-turbine-powered generators, two waterjet propulsion segments and the vessel operating engineering, provided in the midships vessel protection area SSB-2, are associated.

37. The corvette vessel-type equipment system as claimed in claim 36, further comprising a third control network, essentially associated with a third vessel protection area SSB-3 and a bow-end vessel protection area SSB-4 and with which the two fuel cell segments, the diesel reformer, the thruster segment and the vessel operating engineering provided in the third vessel protection area SSB-3 and in the bow-end vessel protection area SSB-4, are associated.

38. The corvette vessel-type equipment system as claimed in claim 1, wherein a propulsion segment includes a 0.3 MW bow jet thruster.

39. The corvette vessel-type equipment system as claimed in claim 1, wherein a propulsion segment includes a thruster segment.

* * * * *